United States Patent
Yeh et al.

(10) Patent No.: US 7,074,848 B2
(45) Date of Patent: Jul. 11, 2006

(54) RESIN COMPOSITIONS AND USES THEREOF

(75) Inventors: Mao-Jung Yeh, Tainan (TW); Chun-Hsiung Chang, Kaohsiung (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 0 days.

(21) Appl. No.: 10/767,364

(22) Filed: Jan. 29, 2004

(65) Prior Publication Data

US 2004/0259994 A1    Dec. 23, 2004

(30) Foreign Application Priority Data

Jan. 29, 2003   (CN) ................................ 92 1 01962

(51) Int. Cl.
   *C08F 114/18*    (2006.01)
(52) U.S. Cl. ...................... 524/544; 524/539; 524/588; 525/326.2; 525/326.5; 525/385; 526/245; 526/279
(58) Field of Classification Search ............... 524/544, 524/588, 539, 280, 317, 365; 525/326.2, 525/326.5, 385; 526/245, 279
See application file for complete search history.

(56) References Cited

U.S. PATENT DOCUMENTS 5,032,641 A * 7/1991 Nanishi et al. ............. 524/544
6,309,707 B1 * 10/2001 Mayer et al. ............... 427/386

FOREIGN PATENT DOCUMENTS

JP         06-345823      * 12/1994

* cited by examiner

*Primary Examiner*—Bernard Lipman
(74) *Attorney, Agent, or Firm*—Scully, Scott, Murphy & Presser, P.C.

(57) ABSTRACT

The invention pertains to a resin composition comprising a polymer and a solvent, characterized in that the polymer is obtained by polymerizing the following monomers:
   (a) an acrylate monomer;
   (b) a tertiary carboxylic ester; and
   (c) a monomer selected from the group consisting of a fluoro acrylate monomer, a silicone monomer, and a mixture thereof.

The resin composition of the invention can be formulated into a coating for a substrate to impart stain resistance to the coated surface.

21 Claims, No Drawings

RESIN COMPOSITIONS AND USES THEREOF

BACKGROUND OF THE INVENTION

1. Field of the Invention

The present invention relates to a resin composition comprising a polymer and a solvent. The resin composition of the invention can be formulated into a coating for a substrate to impart a stain resistance to the coated surface.

2. Description of the Prior Art

In the past, a coating material for forming a protective layer on a substrate was normally required to be conveniently applied to the surface of the substrate and adhered to the surface permanently so as to obtain an aesthetic appearance. A coating material had not been strictly required to exhibit stain resistant properties. However, there are materials existing in our living environment which will contaminate a coating layer, damage the appearance of the coated surface, deprive the coated surface of protection properties, and shorten the duration time of the coating.

It is conventional to apply an acrylic resin coating, an alkyd resin coating, a novolak resin coating, an amino resin coating, or an epoxy resin coating to the surface of a substrate. Although the resin coatings may meet short-term requirements, due to the poor structural morphology, low surface hardness, and high surface energy of the resins per se, the resin coatings would not be able to provide the coated surfaces with satisfactory stain resistant properties. Since coatings that satisfy consumers' needs should possess highly stain resistant properties, in coating industry, there is a continuous need for a coating material exhibiting satisfactory stain resistant performance.

JP 6-345823 discloses a fluorine-containing copolymer resin which may provide good weathering resistance and water repellence after a long-term outdoor exposure. The copolymer is obtained by polymerizing a hydroxy-containing acrylate monomer, a fluoroolefin monomer and a perfluorovinyl monomer. The resultant resin is cured by a non-yellowing isocyanate curing agent at room temperature to form a coating. Upon a six-month outdoor exposure, the coating still keeps the original surface gloss and water repellence.

JP 7-026204 discloses a fluorine-containing polyurethane polymer. The polymer is prepared from the polymerization of a polyol which has an unsaturated group in the molecule and has an average molecular weight of from 300 to 3,000 and perfluoro acrylic acid or a perfluorovinyl monomer. The resultant resin is cured by an isocyanate ester at room temperature to form a coating. Upon a 2000-hour exposure in an expedited weathering tester, the coating retains more than 88% of the original surface gloss, higher than the 70% surface gloss of the fluoroolefin-vinyl ether polymer coating produced by Asahi Glass Fluoropolymers Co., Ltd. The organic fluoro polymer coating of JP 7-026204 is resistant to weathering, corrosion, and chemicals.

Although the above-mentioned prior art techniques may resolve the problem associated with the staining of coatings resulted from some staining materials, it is still necessary to seek for other coating materials exhibiting stain resistance against other staining sources.

Moreover, there are prior art techniques that incorporate a long fluoro side-chain into a resin and provide the resin with —OH radicals so as to impart reactivity to the product. However, in view of the difference in the polarities of the monomers, there would exist phase separation in the resultant resins which would result in the breaks of the coating film and the reduction of the stain resistance of the coating film.

DESCRIPTION OF THE INVENTION

The inventors of the application found that by utilizing a long side-chain fluoro segment or siloxane segment, the surface tension of the resultant coating film can be reduced and the stain resistance thereof will be enhanced. In addition, the invention uses tertiary carboxylates to impart compatibility to the resultant fluoro-containing coating film. The present invention could effectively resolve the problems associated with the deterioration of coating films and the reduction in stain resistance of the coating films encountered in the prior art. Moreover, the coating composition of the invention may utilize any kind of curing agents and be useful for a variety of substrate materials.

Accordingly, the present invention provides a resin composition comprising a polymer and a solvent, wherein said polymer is obtained by polymerizing the following monomers:

(a) an acrylate monomer;
(b) a tertiary carboxylic ester; and
(c) a monomer selected from the group consisting of a fluoro acrylate monomer, a siloxane monomer, and a mixture thereof.

The solvent which may be useful in the composition of the present invention is obvious to persons skilled in the art. Examples of the solvent include a benzene compound, an ester, and a ketone, and a mixture thereof. Non-limiting examples of the benzene solvent include benzene, o-xylene, m-xylene, p-xylene, trimethylbenzene, and styrene, and a mixture thereof. Non-limiting examples of the ester solvent include ethyl acetate, butyl acetate, diethyl carbonate, ethyl formate, methyl acetate, ethoxyethyl acetate, ethoxypropyl acetate, and monomethyl ether propylene glycol ester, and a mixture thereof. Non-limiting examples of the ketone solvent include acetone, methyl ethyl ketone, and methyl isobutyl ketone, and a mixture thereof.

In the composition of the present invention, the solvent is present in an amount, based on the total weight of the composition, of from 20 to 70 wt %, preferably from 30 to 60 wt %.

The acrylate monomer used to form the polymer of the invention has the following general formula:

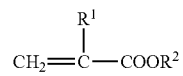

wherein $R^1$ is halogen, H, $CH_3$, or $C_2H_5$; and $R^2$ is H, $CH_3$, $C_2H_5$, $C_3H_7$, $C_4H_9$, $C_2H_4OH$, $C_3H_6OH$, $NH_2$, $C_{10}H_{17}$, or the group of the following formula:

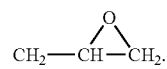

Preferred acrylate monomers include acrylic acid, methacrylic acid, methyl acrylate, methyl 2-methyl-acrylate, butyl acrylate, butyl methacrylate, 2-hydroxyethyl acrylate, 2-hydroxyethyl methacrylate, 2-hydroxypropyl methacrylate, or hexyl 2-ethylacrylate, and a mixture thereof. The amount of the acrylate monomer, based on the total weight of the monomers used, is in the range of from 20 to 80 wt %, preferably from 30 to 70 wt %.

The tertiary carboxylic ester used to form the polymer of the invention has the following general formula:

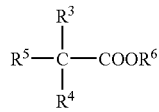

wherein $R^3$, $R^4$, and $R^5$ independently represent a straight or branched alkyl chain: $C_mH_{2m+1}$, wherein m is an integer ranging from 1 to 15, and $R^6$ is selected from the group consisting of

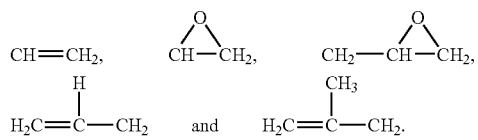

Preferred tertiary carboxylic esters include vinyl saturated tertiary decanoate, vinyl saturated tertiary nonanoate, and epoxy propyl saturated tertiary decanoate and a mixture thereof. The amount of the tertiary carboxylic ester, based on the total weight of the monomers used, is in the range of from 5 to 50 wt %, preferably from 5 to 30 wt %.

The fluoro acrylate monomer used to form the polymer of the invention has the following general formula:

$$R^fCH_2C_2O(O)CC(R)=CH_2$$

wherein $R^f$ is a straight or branched perfluoroalkyl chain: $C_nF_{2n+1}$, wherein n is an integer ranging from 2 to 20, and R is H, $CH_3$, $C_2H_5$, or $C_3H_7$.

Preferred fluoro acrylate monomers include a fluoroalkyl methacrylate or a mixture thereof. More preferably, the fluoro acrylate monomers are of the above formula in which n ranges from 6 to 14. According to the present invention, the amount of the fluoro acrylate monomer, based on the total weight of the monomers used, is in the range from 1 to 40 wt %, preferably from 1 to 20 wt %.

The siloxane monomer used to form the polymer of the present invention has the following general formula:

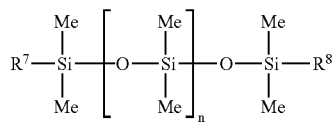

wherein $R^7$ and $R^8$ independently are H, $CH_3$, $CH_2$=CH, $NH_2$, $NH_2$—$C_3H_6$, OH—$C_2H_4OC_3H_6$, CH=$CCH_3$—COOH, CH=CH—COOH, or

wherein n=10 to 250.

When used in the present invention, the amount of the silixane monomer, based on the total weight of the monomers used, is in the range of from 1 to 40 wt %, preferably from 1 to 20 wt %.

The polymer of the present invention may optionally comprise a vinyl monomer of the following general formula:

wherein R is selected from the group consisting of:

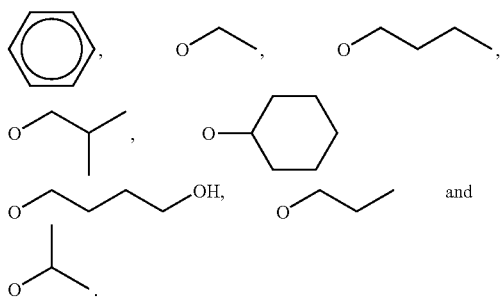

Preferred vinyl monomers include styrene, vinyl ethyl ether, cyclohexyl vinyl ether, 4-hydroxybutyl vinyl ether, n-butyl vinyl ether, isobutyl vinyl ether, n-propyl vinyl ether, and isopropyl vinyl ether, and a mixture thereof. If present, the amount of the vinyl monomer, based on the total weight of the monomers used, is in the range of from 5 to 40 wt %, preferably from 5 to 25 wt %.

The polymer of the invention can be prepared by any methods well known to persons skilled in the art. For example, the various monomers used in the polymerization for preparing the polymer of the present invention may be mixed with a suitable solvent and an initiator, and polymerized at a suitable temperature and reaction time to form the polymer of the invention.

Optionally, the composition of the invention may be formulated into a coating by incorporating a conventional additive, such as a curing agent, well known to persons skilled in the art, and be coated on the surfaces of any suitable substrates, such as a metal, an alloy, a computer case, wooden material, plastic material, leather, or stone material, so as to impart stain resistance to the coated surfaces. Suitable curing agents include, but not limited to, melamine, methylated melamine, or isocyanate ester.

The present invention will be further described in the following examples. However, the examples will not make any limitations to the scope of the invention. Any modifications or alterations on the invention that can be easily accomplished by persons skilled in the art are encompassed in the disclosure of the specification and the accompanying claims.

EXAMPLES

Definition:
  AA: acrylic acid
  MAA: methacrylic acid
  MMA: methyl methacrylate
  IBMA: isobornyl methacrylate
  BA: butyl acrylate
  BAc: butyl acetate
  n-BMA: n-butyl methacrylate
  2-HPMA: 2-hydroxypropyl methacrylate
  FAMA: 2-(perfluoroalkyl)ethyl acrylate and a mixture thereof
  AS: silicone methyl methacrylate
  GETCA: neodecanoic acid glycidyl ester
  PMA: propylene glycol monomethyl acetate
  TBPB: t-butyl perbenzoate Example 1–7

Resin compositions are prepared from the monomers and solvent at different ratios as shown in the following Table 1:

TABLE 1

| Example no. | | 1 | 2 | 3 | 4 | 5 | 6 | 7 |
|---|---|---|---|---|---|---|---|---|
| Monomers/ amounts (g) | AA | 13.4 | 10.5 | 10.5 | 10.5 | 13.4 | 10.5 | 10.5 |
| | MAA | 0.6 | 0.6 | 0.6 | 0.6 | 0.6 | 0.6 | 0.6 |
| | MMA | 39.6 | 21.8 | 14.5 | 43.6 | 23.8 | 39.6 | 39.6 |
| | IBMA | — | 21.8 | 29.0 | — | — | — | — |
| | BA | 17.1 | — | — | — | 39.6 | 14.9 | 14.9 |
| | n-BMA | — | 10.5 | 10.5 | 10.5 | — | — | — |
| | HPMA | 13.2 | 31.5 | 31.5 | 31.5 | 6.6 | 28.6 | 28.6 |
| | FAMA | 7.0 | 3.6 | 3.6 | 3.0 | 7.0 | 7.0 | — |
| | AS | — | 7.0 | 7.0 | 7.0 | — | — | — |
| | GETCA | 46.6 | 18.6 | 18.6 | 18.6 | 46.6 | 36.3 | 23.3 |
| Solvent (xylene) (g) | | 88 | 111 | 105 | 111 | 88 | 88 | 88 |
| Addition of PMA (g) | | 17.6 | 17.6 | 17.6 | 17.6 | 17.6 | 17.6 | 17.6 |
| Initiator (g) TBPB | | 0.5 | 3.0 | 3.0 | 3.6 | 0.5 | 0.5 | 0.5 |
| Reaction temperature | | 130° C. | 130° C. | 130° C. | 130° C. | 130° C. | 130° C. | 130° C. |
| Time (hour) | | 8 | 8 | 8 | 8 | 8 | 8 | 8 |
| Solids content (wt %) | | 56.9 | 49.1 | 49.8 | 51.5 | 55.6 | 56.4 | 54 |

The formulations for stain resistance test, as shown in following table, are prepared from the compositions shown in Table 1. The results of the test are shown in Table 2 below.

| Paint Formula | |
|---|---|
| Resin composition | 10 g |
| Curing agent (cymel 303[a]) or N-3390[b]) | 1.4 g/2.1 g |
| BAc | 5–7 g |
| p-Methyl benzene sulfonic acid | 0.01 g |

[a])Commercially available from Cytec Corporation
[b])Commercially available from Bayer Corporation Substrate: Tinplate
Curing: High temperature, cymel 303: 150° C.×30 min
Low temperature, N-3390: 60° C.×30 min and 3 days at room temperature

TABLE 2

| | Example Number | | | | | | | |
|---|---|---|---|---|---|---|---|---|
| | High temperature curing | | | | Low temperature curing | | | |
| Staining Source | 1 | 5 | 6 | 7 | 2 | 3 | 4 | 7 |
| Stained by lipstick (Shiseido), duration time (hour) | 3 | 3 | 3 | 3 | 3 | 3 | 3 | 3 |
| Cleanness level after being wiped by tissue paper | 1 | 2 | 1 | 5 | 2 | 2 | 2 | 5 |
| Stained by black marker pen, duration time (minute) | 60 | 60 | 60 | 60 | 60 | 60 | 60 | 60 |
| Cleanness level after being wiped by tissue paper | 1 | 2 | 2 | 5 | 2 | 2 | 2 | 5 |
| Stained by coffee, duration time (minute) | 60 | 60 | 60 | 60 | 60 | 60 | 60 | 60 |
| Cleanness level after being wiped by tissue paper | 1 | 1 | 1 | 4 | 1 | 1 | 1 | 4 |
| Stained by No. 30 Motor Oil (Chinese Petroleum Corporation), duration time (hour) | 3 | 3 | 3 | 3 | 3 | 3 | 3 | 3 |
| Cleanness level after being wiped by tissue paper | 1 | 2 | 1 | 4 | 2 | 2 | 2 | 4 |
| Stained by golden-paint brush, duration time (minute) | 60 | 60 | 60 | 60 | 60 | 60 | 60 | 60 |
| Cleanness level after being wiped by tissue paper | 2 | 2 | 2 | 5 | 2 | 2 | 2 | 5 |

TABLE 2-continued

| | Example Number | | | | | | | |
|---|---|---|---|---|---|---|---|---|
| | High temperature curing | | | | Low temperature curing | | | |
| Staining Source | 1 | 5 | 6 | 7 | 2 | 3 | 4 | 7 |
| Stained by black crayon, duration time (hour) | 3 | 3 | 3 | 3 | 3 | 3 | 3 | 3 |
| Cleanness level after being wiped by tissue paper | 1 | 2 | 1 | 5 | 2 | 2 | 1 | 5 |
| Stained by 5% carbon black, duration time (hour) | 3 | 3 | 3 | 3 | 3 | 3 | 3 | 3 |
| Cleanness level after being wiped by tissue paper | 1 | 2 | 2 | 5 | 2 | 2 | 2 | 5 |

Note:
Cleanness level: 1 represents "excellent"; 2 represents "good"; 3 represents "acceptable"; 4 represents "poor"; and 5 represents "very poor."

According to the results shown in Table 2, the polymers obtained from the monomers comprising a fluoroacrylate monomer or silixane monomer exhibit excellent stain resistance.

What is claimed is:

1. A resin composition comprising a polymer and a solvent, characterized in that said polymer is obtained by polymerizing the following monomers:
   (a) an acrylate monomer;
   (b) a tertiary carboxylic ester having the following general formula:

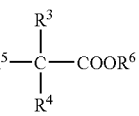

wherein $R^3$, $R^4$, and $R^5$ each independently represent a straight or branched alkyl chain of the formula $C_mH_{2m+1}$, wherein m is an integer ranging from 1 to 15, and $R^6$ is selected from the group consisting of

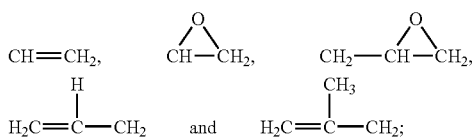

and (c) a monomer selected from the group consisting of a fluoro acrylate monomer, a siloxane monomer, and a mixture thereof.

2. The composition of claim 1 wherein said solvent is a benzene compound, an ester, or a ketone, or a mixture thereof.

3. The composition of claim 2 wherein said benzene compound is selected from the group consisting of benzene, o-xylene, m-xylene, p-xylene, trimethylbenzene, styrene, and a mixture thereof.

4. The composition of claim 2 wherein said ester is selected from the group consisting of ethyl acetate, butyl acetate, diethyl carbonate, ethyl formate, methyl acetate, ethoxyethyl acetate, ethoxypropyl acetate, and monomethyl ether propylene glycol ester, and a mixture thereof.

5. The composition of claim 2 wherein said ketone is selected from the group consisting of acetone, methyl ethyl ketone, and methyl isobutyl ketone, and a mixture thereof.

6. The composition of claim 1 wherein said acrylate monomer has the following general formula:

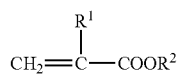

wherein $R^1$ is halogen, H, $CH_3$, or $C_2H_5$; and $R^2$ is H, $CH_3$, $C_2H_5$, $C_3H_7$, $C_4H_9$, $C_2H_4OH$, $C_3H_6OH$, $NH_2$, $C_{10}H_{17}$, or the group of the following formula:

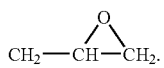

7. The composition of claim 6 wherein said acrylate monomer is selected from the group consisting of acrylic acid, methacrylic acid, methyl acrylate, methyl 2-methylacrylate, butyl acrylate, butyl methacrylate, 2-hydroxyethyl acrylate, 2-hydroxyethyl methacrylate, 2-hydroxypropyl methacrylate, and hexyl 2-ethylacrylate, and a mixture thereof.

8. The composition of claim 1 wherein said tertiary carboxylic ester is selected from the group consisting of vinyl saturated tertiary decanoate, vinyl saturated tertiary nonanoate, and epoxy propyl saturated tertiary decanoate, and a mixture thereof.

9. The composition of claim 1 wherein said fluoro acrylate monomer has the following general formula:

wherein $R^f$ is a straight or branched perfluoroalkyl chain: $C_nF_{2n+1}$, wherein n is an integer ranging from 2 to 20, and R is H, $CH_3$, $C_2H_5$, or $C_3H_7$.

10. The composition of claim 9 wherein said fluoro acrylate monomer is a fluoroalkyl methacrylate or a mixture thereof.

11. The composition of claim 1 further comprising one or more vinyl monomers.

12. The composition of claim 11 wherein said vinyl monomer has the following general formula:

wherein R is selected from the group consisting of:

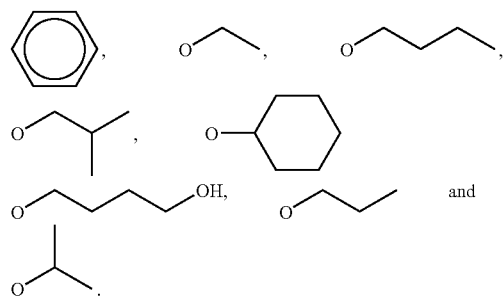

13. The composition of claim 11 wherein said vinyl monomer is selected from the group consisting of styrene, vinyl ether, cyclohexyl vinyl ether, 4-hydroxybutyl vinyl ether, n-butyl vinyl ether, isobutyl vinyl ether, n-propyl vinyl ether, and a mixture thereof.

14. The composition of claim 1 wherein said solvent is present in an amount, based on the total weight of the composition, of from 20 to 70 wt %.

15. The composition of claim 1 wherein said solvent is present in an amount, based on the total weight of the monomers used, of from 20 to 80 wt %.

16. The composition of claim wherein said tertiary carboxylic ester is present in an amount, based on the total weight of the monomers used, of from 5 to 50 wt %.

17. The composition of claim 1 wherein said fluoro acrylate monomer is present is an amount, based on the total amount of the monomers used, of from 1 to 40 wt %.

18. The composition of claim 11 wherein said vinyl monomer is present in an amount, based on the total weight of the monomers used, of from 5 to 40 wt %.

19. A coating for the surface of a substrate comprising the resin composition of claim 1.

20. A method of coating the surface of a substrate comprising applying the resin composition of claim 1 to the surface of the substrate.

21. The method of claim 20 wherein said substrate is a metal, an alloy, a computer case, a wooden article, plastic material, leather, or stone material.